March 1, 1932.  H. A. CALDERWOOD  1,847,924
GROUNDING CONNECTION FOR WIRING SYSTEMS
Filed May 7, 1928
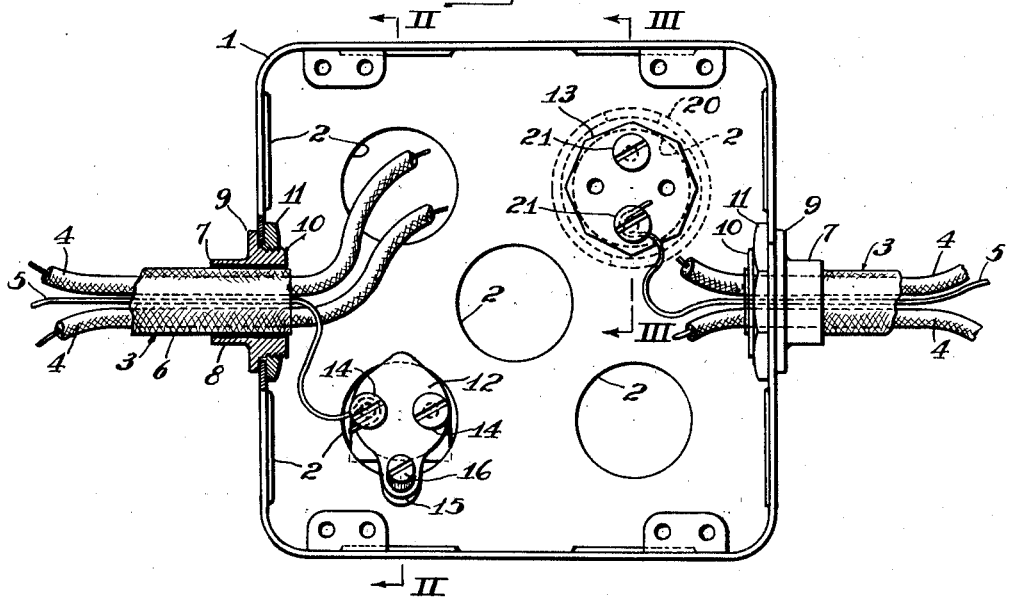
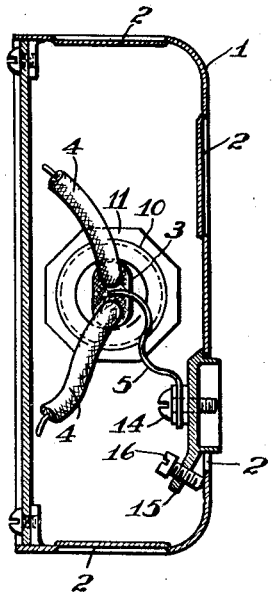
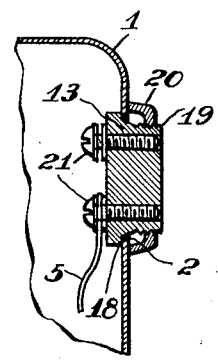
WITNESS
A B Wallace.
INVENTOR
Hugh A. Calderwood,
by Christy & Christy,
Attys.

Patented Mar. 1, 1932

1,847,924

UNITED STATES PATENT OFFICE

HUGH A. CALDERWOOD, OF PITTSBURGH, PENNSYLVANIA, ASSIGNOR, BY MESNE ASSIGNMENTS, TO NATIONAL ELECTRIC PRODUCTS CORPORATION, A CORPORATION OF DELAWARE

GROUNDING CONNECTION FOR WIRING SYSTEMS

Application filed May 7, 1928. Serial No. 275,706.

In electrical installations in buildings, etc., it usually is required, for purposes of safety and in accordance with wiring regulations, that conduit systems, armored cable systems, and the like, including junction boxes, panel boxes and outlet boxes connected thereto, be grounded or earthed. It is also sometimes required that junction boxes, outlet boxes, switch boxes, etc., and metal parts of various fixtures and devices other than conduit systems, and systems having wires enclosed in metal raceways or metal armor, shall be grounded or earthed; such "other" systems or methods of wiring are sometimes called non-metallic systems, knob-and-tube wiring, non-metallic cables, and so forth.

It is also sometimes required or deemed desirable that current-carrying or active conductors of diverse electrical systems shall be grounded or earthed at one or more points in a given installation, as for example in interior wiring for lighting and power in houses, offices, theatres, factories, etc. The desired or required grounding thus described may be accomplished by utilizing the natural or inherent electrically conductive path provided by metallic conduit, metallic raceways, metallic cable armor and the like, but it is also customary in many cases to install a special conductor such as a copper or other metal wire to establish an electrical circuit or path for current between the object to be grounded and the more or less distant point of connection to earth, such as a water pipe, or to points on the metal conduit, metal cable, armor or other protective enclosure itself.

Such special grounding conductor, also known as a safety conductor, a "third" wire, etc., may be run in a more or less direct line from the object to be grounded to a nearby point of earthing connection quite independent of the route taken by the regular live or active conductors of the system, or it may be associated with them by being drawn into the same conduit, or fabricated in the same assembly to form a cable either of the metal armored type, or so-called lead sheathed type, or so-called non-metallic sheathed type, and it may be insulated or uninsulated and bare, in fact it may be and sometimes is a bare wire laid in intimate contact with the protective metal enclosure, such as conduit or armored cable with which it is associated.

It is also necessary at times to electrically bond or join the non-current-carrying metal parts of isolated or separated pieces of electrical equipment to maintain them at the same potential.

I have thus briefly described the various types and ways of grounding circuits, and of bonding and grounding non-current-carrying parts of electrical equipment in order to make clear the purpose and usefulness of the present invention, which will be fully described hereinafter and illustrated by drawings.

The invention is designed for the purpose of the electrical connection of grounding and bonding so-called safety wires, and current-carrying circuit wires, to metal enclosures such as outlet boxes, panel boxes, junction boxes, switch boxes, motor, meter and heater housings and the like. Heretofore such connections have been made to screws in specially tapped holes, or to bolts, lugs, brackets or clamps which are always, so far as I am aware, fastened by screws, bolts or rivets to the metal structure or to portions of connectors, bushings and similar fittings by which conduits and cables are secured to the walls of such boxes and cabinets.

Such attachments must either be made by the manufacturer of the boxes and other housings, in which case many of them would likely not be needed, therefore adding unnecessarily to the cost of all such boxes, or if not provided by the manufacturer, they must be provided and attached by hand by the installer, thus entailing considerable labor and expense for drilling and tapping holes.

It is the object of the present invention to render unnecessary any special provision for this purpose in the structure of the box itself, and to make it cheap, easy and convenient for the installer to make effective ground connections to the boxes and other structures described with only such simple tools as screw drivers, pliers and wrench, and I do this by providing a metallic insert or plug which may be fitted into one of the holes present in outlet boxes and like structures for the entrance of conduits, cables and wires, particularly those holes made by the removal of knockouts, a device well known in the art.

These metal inserts or plugs are provided with a screw, bolt or lug in electrical engagement with the insert for the attachment of a wire, and are also provided with means for mechanically locking them in the knockout opening and in electrical engagement with the flat wall of the box or the edges of the aperture or both, so that by attaching the safety or grounding wire, or the grounded circuit wire or bonding wire previously referred to in the usual way, a good electrical connection to the metal wall of the box or other structure will be established.

In the accompanying drawings Figure 1 is a horizontal section of a common type of outlet box having secured in two of the usual knockout openings in its floor two variant forms of conducting plugs included within the present invention. Figure 2 is a sectional elevation on the line II—II, and Figure 3 a like view on the line III—III, of Figure 1.

The outlet box 1 is shown as typical of a variety of electrical fixtures having knockout openings indicated by the numeral 2. Such knockout openings are well known in the art, being simply localities in the walls and floor of the box or other fixture in which the metal of the body is weakened, and sometimes partially displaced, on the line defining the proposed opening, so that the opening itself may be readily formed by the workman making the installation, by breaking it out by a sharp blow and twist upon the metal filling the opening. For purposes of illustration I have shown in Figure 1 two non-metallic cables 3 entering the outlet box 1 through knockout openings 2 on the opposite sides of the box. Each of the cables 3 comprises the insulated conductors 4 and the bare conducting wire 5 confined together within the non-metallic sheath 6. The cables may be held in place in the walls of the outlet box by any suitable connectors.

For purposes of illustration I have shown herein the sleeve 7 having the outer bifurcated portion 8, the flange 9 bearing against the outer wall of the box, and the externally threaded barrel portion 10 extending through the outlet opening and having the lock nut 11 which binds the sleeve in the knockout opening. In one of the knockout openings in the floor of the box I have shown the conducting plug 12, and in another knockout opening a plug 13 of another form. Various means, many of which are well known in the art, may be employed for securing these plugs 12 and 13 in position. The plug 12 is a metallic structure carrying the contact screws 14 (one or more), and having a backwardly inclined ear 15 having a threaded opening through which passes the inclined screw 16. When the plug 12 is inserted in a knockout opening it is secured in place by turning the screw 16 into firm contact with the inner face of the wall of the box, thus pushing the wall of the plug at the side opposite the screw 16 into firm contact with the edge of the knockout opening 2. Then by coiling the end of the wire 5 around the shank of the contact screw 14 and tightening the contact screw as usual, a firm electrical connection is obtained between the wire 5 and the metallic wall of the outlet box 1.

The other plug 13 is made of conductive metal and comprises an inner flanged portion 18 adapted to rest against the inner face of the floor of the box around the knockout opening, a threaded shank 19 passing through the knockout opening and a lock nut 20 which is secured upon the shank 19 and makes electrical contact with the outer face of the floor of the box. This plug is provided with contact screws 21 (one or more) with which the wire 5 of the other cable is connected.

Boxes and other similar electrical fittings or fixtures are privided with knockout openings which are of standard sizes. Therefore for the purposes to which the present invention is directed, I have obviated the need of providing the box or other fitting itself with any specially constructed integral means for supplying electrical connection between the box and a so-called grounding wire or safety wire. The contact plugs described herein are cheaply made and can be applied by any workman in any box or other fitting where their use is required.

By the use in the appended claims of the term "service opening" I intend to designate an opening, of which the usual knock-out opening is one example, provided in the electrical fitting or fixture for a purpose other than its use in the present combination. In other words, I intend the term to designate an opening which is necessarily in the fitting, and not a specially provided opening such as a threaded hole to receive a screw, as hereinbefore recognized as old.

It will of course be understood that if it should be desired to make a ground connection from the outlet box or other fitting to a nearby water pipe or other point of attachment, the contact plug can be inserted from the outside of the box and the grounding wire be connected to a contact screw on the outside.

It will also be understood that the invention is not limited to any particular form of contact plug or to any particular means for securing it in place in the outlet opening. I have simply shown in the accompanying drawings two specific forms of contact plugs, each provided with suitable means for securing it in place.

I claim as my invention:

1. A combined knockout closure and grounding contact for an outlet box comprising a member of conducting material of a size and shape to substantially fill and close a standard knockout aperture, means for engaging the member in intimate electrical and mechanical connection with the periphery of the aperture, and means for attaching an electrical conductor to the member.

2. In combination an electrical outlet box having a plurality of apertures for the admission of electrical conductors, a closure member of conducting material in one of the apertures in intimate mechanical and electrical connection with the box edge adjacent the aperture, an electrical conductor entering the box through another of the apertures and the end of the conductor in electrical connection with the closure member.

In testimony whereof I have hereunto set my hand.

HUGH A. CALDERWOOD.